Figures 1, 2:
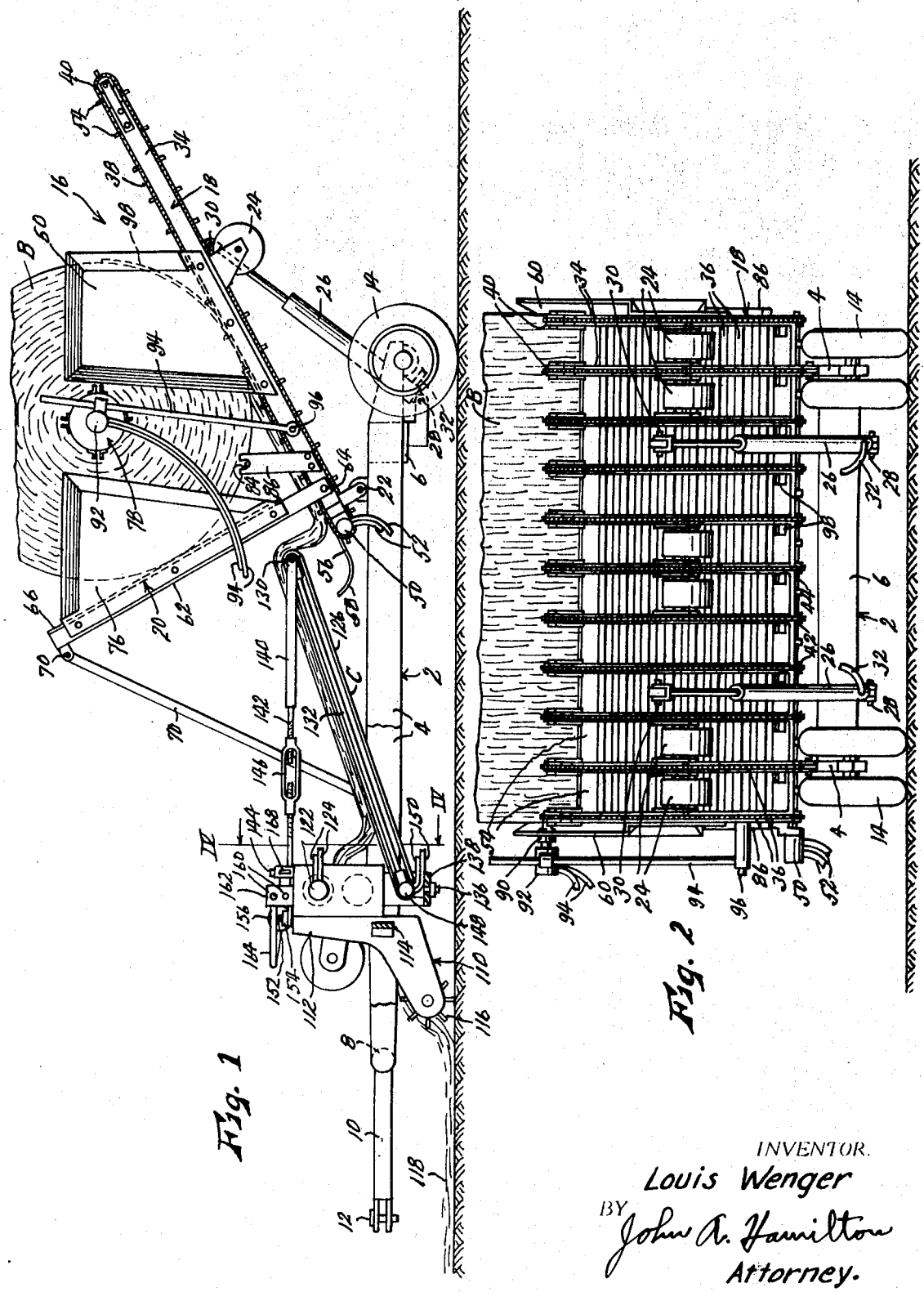

United States Patent
Wenger

[15] 3,665,690
[45] May 30, 1972

[54] HAY BALING MACHINE

[72] Inventor: Louis Wenger, 1504 Lake View Drive, Sabetha, Kans. 66534

[22] Filed: Feb. 8, 1971

[21] Appl. No.: 113,549

[52] U.S. Cl. .................................................56/341
[51] Int. Cl. .......................................A01d 39/00
[58] Field of Search ..............................56/341, 343; 100/76

[56] References Cited

UNITED STATES PATENTS 3,534,537  10/1970  Buchele et al. ..........................56/341

Primary Examiner—Louis G. Mancene
Assistant Examiner—J. N. Eskovitz
Attorney—John A. Hamilton

[57] ABSTRACT

A hay baling machine consisting of a wheeled frame adapted to be towed, an upwardly opening V-shaped trough carried by said frame and comprising an inclined wall and a relatively angled platform, hay pick-up and transporting devices carried by said frame and operable to pick up hay from the ground and deposit it in said trough, a powered rotary spindle disposed in said trough parallel to the apex thereof and movable away from said apex, and powered conveyor chains carried by said platform and movable at right angles to the apex thereof, whereby hay desposited in said trough is wound on said spindle to form a cylindrical bale constantly rotated by said conveyor chains, said spindle being removable from said bale and said platform being pivotally movable to be inclined downwardly toward its free edge, whereby said bale may be discharged to the ground.

13 Claims, 7 Drawing Figures

Patented May 30, 1972

3,665,690

4 Sheets-Sheet 1

INVENTOR.
Louis Wenger
BY John A. Hamilton
Attorney.

INVENTOR.
Louis Wenger
BY John A. Hamilton
Attorney.

Patented May 30, 1972

3,665,690

4 Sheets-Sheet 4

INVENTOR
Louis Wenger
BY
John A. Hamilton
Attorney.

HAY BALING MACHINE

This invention relates to new and useful improvements in hay baling machines, and has as its principal object the provision of a baling machine operable to produce very large cylindrical bales, say perhaps 8 feet in diameter, 12 or 13 feet in length, and weighing in excess of 8 tons. Such large bales offer advantages in economy of handling, and in the storage and preservation of large quantities of hay without the necessity of storing the bales under cover to protect them from the elements.

Another object is the provision of a baling machine of the character described which "thatches" the surface of the bales, tending to arrange the strands of hay in parallel relation and pressing them firmly into the bale surface, whereby to better shed rain and the like by reducing any penetration of water thereinto to a minimum.

A further object is the provision of a baling machine of the character described which eliminates any necessity of powerful, complicated and expensive presses to compact the hay in the bale, the bales instead being compacted by their own great weight as they are formed.

A still further object is the provision of a baling machine of the character described which produces a cylindrical bale having a hollow tubular opening formed therethrough. Pressurized hot air may thus be fed into said opening and will filter outwardly through the body of the bale to facilitate curing of the hay.

Still another object is the provision of a baling machine of the character described which is adapted to serve as a handling device for the bales formed thereby both in depositing said bales gently on the ground wherever desired, and to pick up and transport said bales when desired.

Other objects are simplicity and economy of construction, and efficiency and dependability of operation.

Figure 3:
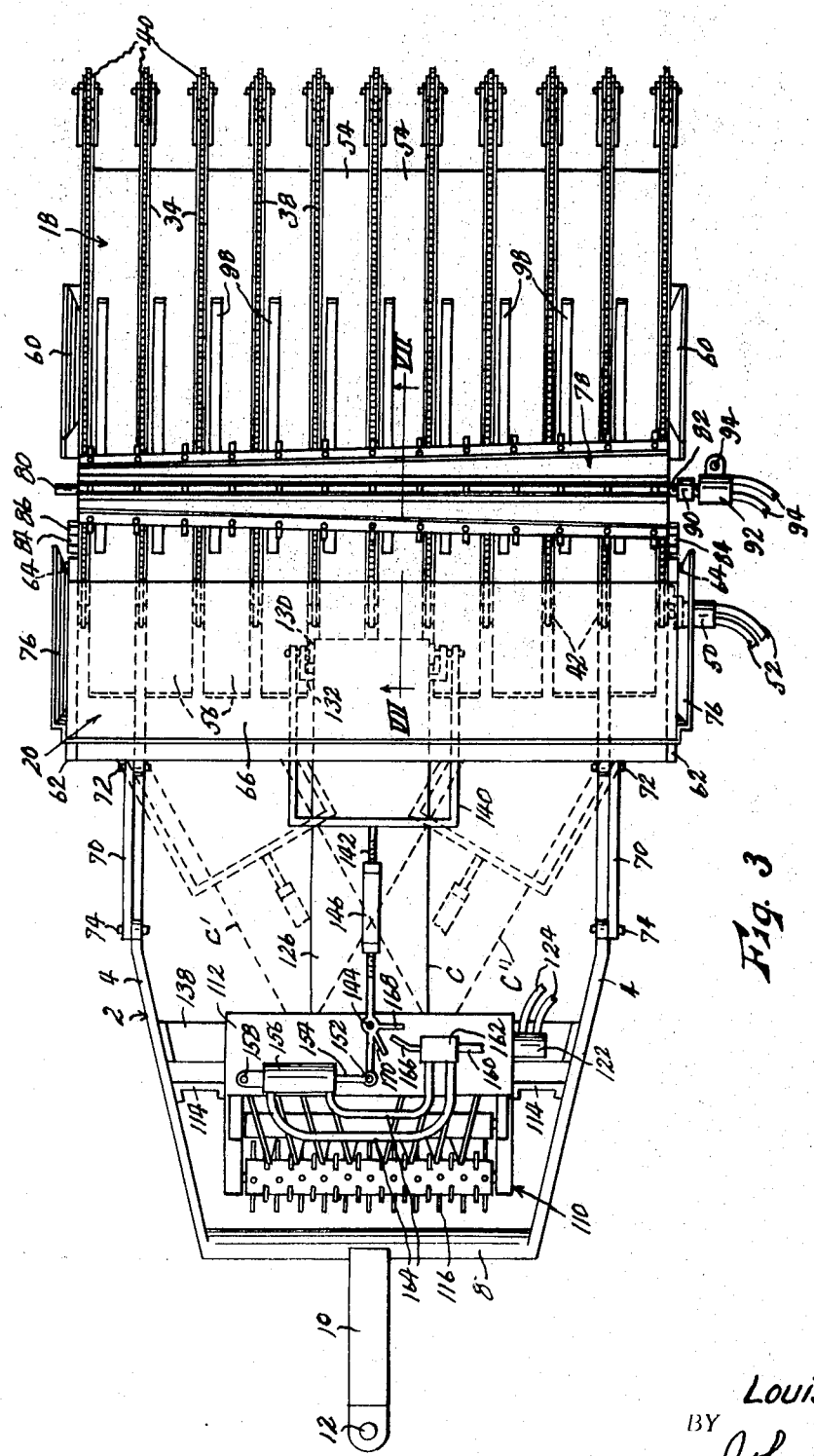
Figure 4:
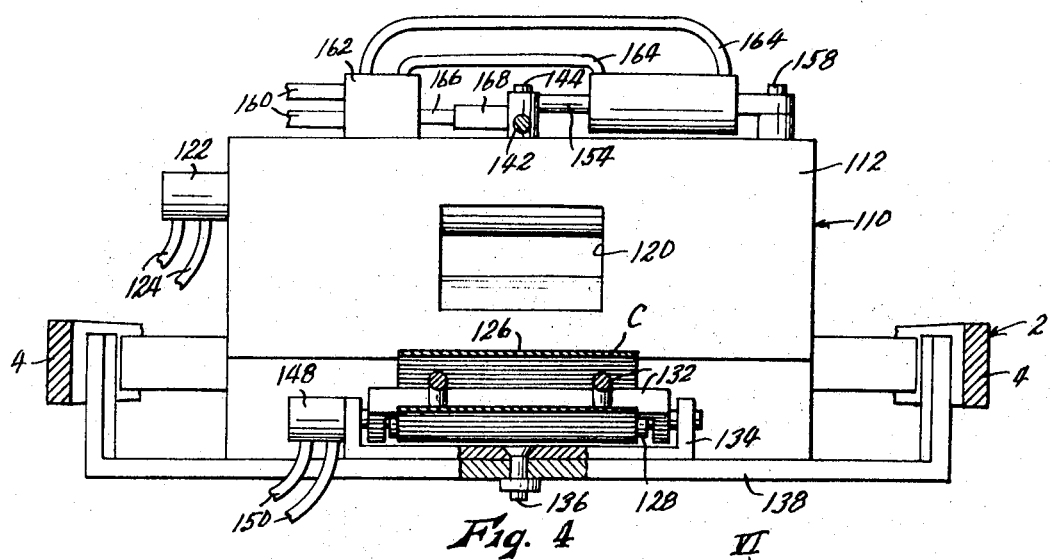
Figure 5:
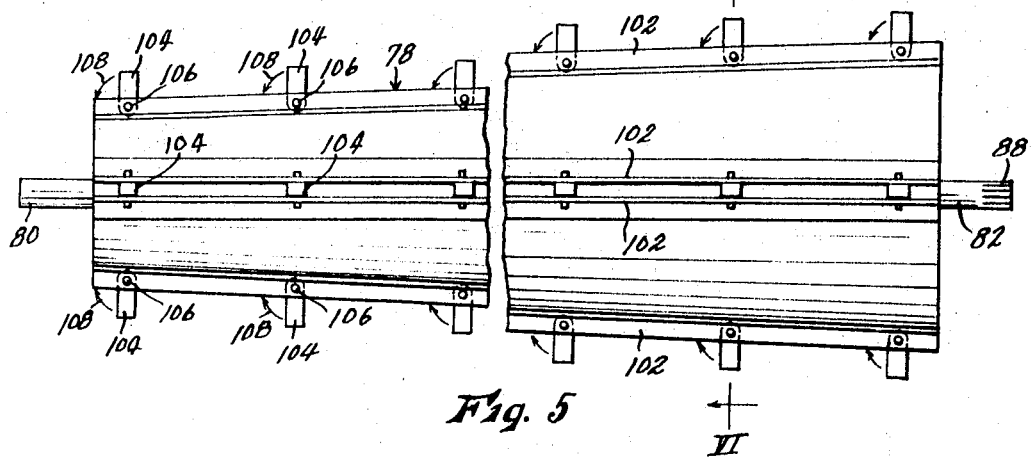
Figure 6:
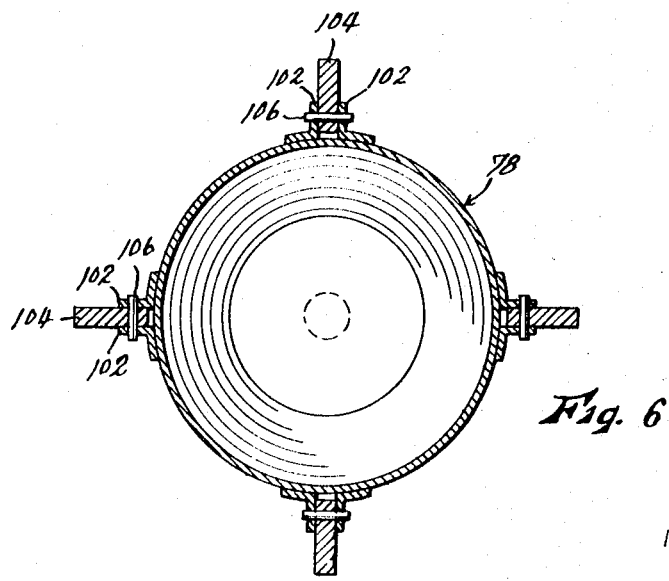
Figure 7:
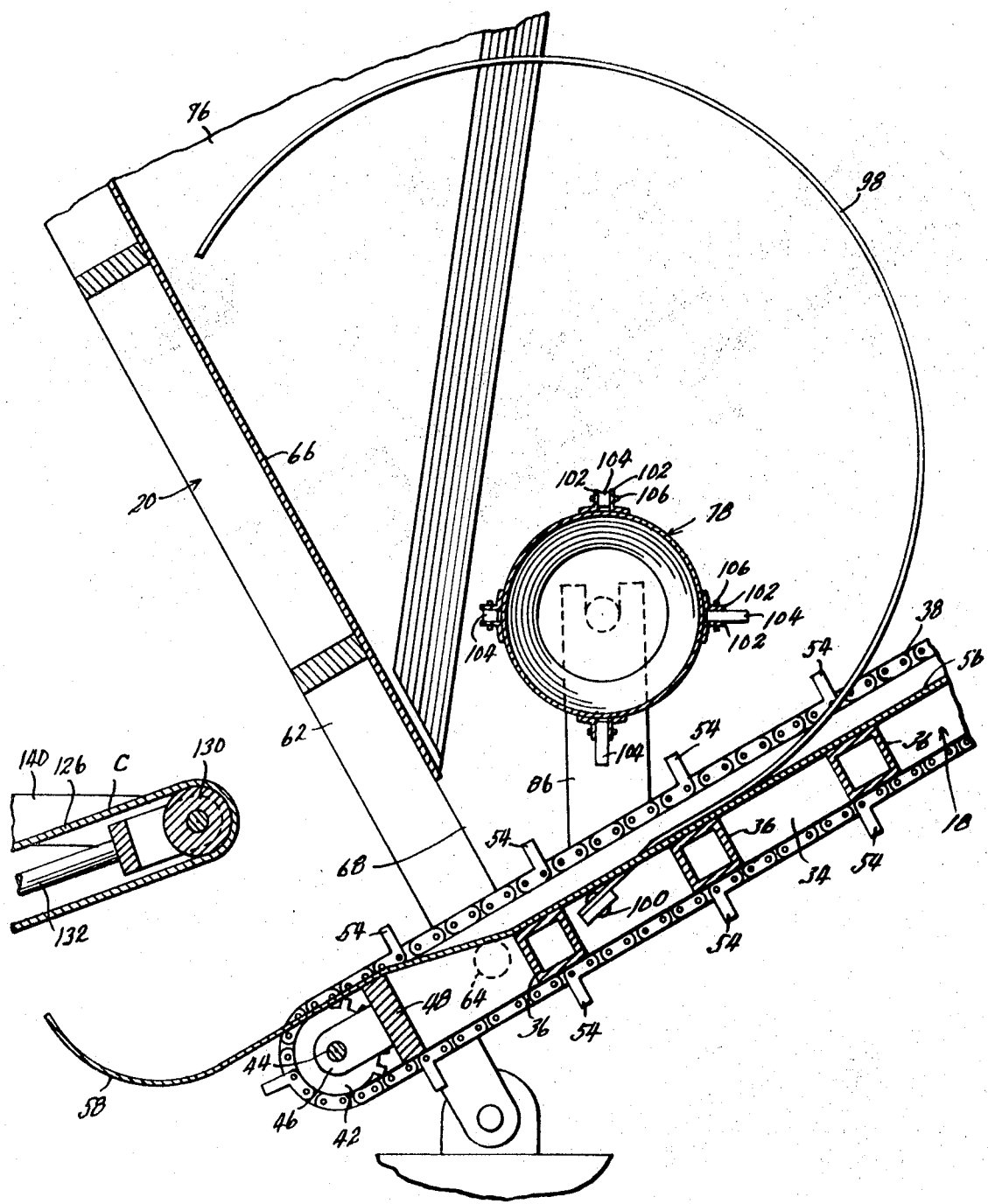

With these objects in view, as well as other objects which will appear in the course of the specification, reference will be had to the accompanying drawing, wherein:

FIG. 1 is a side elevational view of a hay baling machine embodying the present invention, partially broken away, with a bale almost completely formed, FIG. 2 is a rear elevational view of the machine as shown in FIG. 1, FIG. 3 is a top plan view of the machine as shown in FIG. 1, with the hay omitted but with the parts otherwise in the same positions, and with various positions of the conveyor indicated in dotted lines, FIG. 4 is an enlarged, fragmentary sectional view taken on line IV—IV of FIG. 1, FIG. 5 is an enlarged elevational view of the core spindle, partially broken away and foreshortened, FIG. 6 is an enlarged sectional view taken on line VI—VI of FIG. 5, and FIG. 7 is an enlarged, fragmentary sectional view taken on line VII—VII of FIG. 3, with the parts positioned to commence the formation of a bale.

Like reference numerals apply to similar parts throughout the several views, and the numeral 2 applies generally to the main frame of the machine. Said frame includes a pair of horizontal, generally parallel side rails 4 rigidly interconnected adjacent their rearward ends by a transverse box beam 6 and at their forward ends by a transverse cross bar 8. Affixed to the midpoint of said cross bar is a forwardly projecting tongue 10 provided at its forward end with a hitch fitting 12 by means of which the machine may be connected to a tractor or the like for towing over the ground. Each side rail 4 is provided at its extreme rearward end with a dual ground-engaging wheel 14 carried rotatably on a horizontal transverse axis, whereby the rearward end of the machine is supported.

Disposed above the rearward portion of frame 2, and projecting rearwardly therefrom, is an upwardly opening V-shaped trough indicated generally by the numeral 16, as indicated in FIG. 1. Said trough comprises a pair of wall members including a platform 18 which is normally inclined upwardly and rearwardly, and a wall member 20 which is inclined upwardly and forwardly. Said platform and wall are generally planar, the intersection of their planes defining the apex of the trough, said apex being horizontal and extending transversely of frame 2.

Adjacent its forward end, platform 18 is pivoted to frame rails 4 on a horizontal transverse axis, or at 22, whereby it may be pivoted from its normal upwardly and rearwardly inclined position, as shown in FIG. 1, to a downwardly and rearwardly inclined position wherein its rearward edge is disposed at or just above the ground level. When in said lowered position, it is supported additionally by ground-engaging rollers 24 carried rotatably thereby in rearwardly spaced relation from pivot 22. Said platform is powered for movement between said raised and lowered positions by a pair of hydraulic rams 26 pivoted at their lower ends, as at 28, to box beam 6, and at their upper ends, as at 30, to the lower side of platform 18 in rearwardly spaced relation from pivot 22. Hydraulic fluid from any suitable source is furnished to rams 26 through hoses 32. Platform 18 comprises a series of forwardly and rearwardly extending parallel beams 34 rigidly connected by cross bars 36 extending transversely therebetween. An endless conveyor chain 38 extends along each of beams 34, its upper and lower reaches riding respectively along the upper and lower edges of said beam. Said chains are trained around sprockets 40 mounted rotatably at the rearward ends of beams 34, and about sprockets 42 at the forward ends of said beams. Sprockets 42 are all mounted on a shaft 44 extending the full width of the platform and journalled rotatably in bearings 46 (see FIG. 7) affixed to a cross bar 48 affixed to the forward ends of beams 34. At one end, shaft 44 is connected to and driven rotatably by a hydraulic motor 50 (see FIGS. 1–3) mounted on one of the sidemost of beams 34, and to which hydraulic fluid is supplied by hoses 52. Said hydraulic motor is reversible, but normally drives chains 38 so that their upper reaches move rearwardly. Attached to each of chains 38 at intervals therealong are a series of outwardly projecting cleats 54. Arranged between each successive pair of beams 34 is a sheet metal floor member 56. Said floor members rest on and are affixed to cross bars 36 of the platform, preferably in spaced relation below the upper edges of beams 34, and extend forwardly beyond forward sprockets 42, being curved upwardly at their forward ends as indicated at 58. Platform 18 is provided with a vertical side wall 60 at each side thereof, intermediate the forward and rearward ends thereof, each of said side walls being secured at its lower edge to the corresponding sidemost beam 34 of the platform. The top, front, and rear edges of each of said side walls is angled or bevelled outwardly, as shown.

Wall 20 of trough 16 is provided with side members 62 which are pivoted at their lower ends, as at 64, to the sidemost beams 34 of platform 18, in rearwardly spaced relation from the forward edge of said platform. Said wall is provided with a sheet metal face plate 66 at its rearward surface, and said face plate terminates at its lower edge in spaced apart relation above platform 18, thereby forming a window 68 (see FIG. 7) between the lower edge of said face plate and the upper surface of said platform. The platform projects forwardly from wall 20, and hay deposited on the forwardly projection portion thereof will be carried rearwardly through said window into the trough by the conveyor chains 38 of said platform, as will appear. A pair of struts 70 each pivoted at 72 to wall 20 at its upper edge extend downwardly and forwardly and are pivoted respectively at their lower ends to the side rails 4 of the main frame as at 74 (see FIG. 3). Wall 20 is provided at each side thereof with a vertical side wall 76 of generally triangular form, each of said side walls being affixed to the corresponding side member 62, and having at its free edge portions angled or bevelled outwardly as shown.

Operable within trough 16 is a spindle indicated generally by the numeral 78, said spindle being horizontal and extending transversely substantially the full width of the trough, parallel to the apex thereof. Said spindle is hollow and of light weight, being conically tapered from one end to the other, and is provided at its respective ends with outwardly projecting stub axles 80 and 82. To start a bale, said spindle is positioned as closely as practical to the apex of trough 16, with stub axles 80 and 82 supported rotatably in upwardly opening notches 84 formed in the upper ends of a pair of posts 86 affixed at their lower ends to the sidemost beams 34 of platform 18. Stub axle 82, at the larger end of the spindle, is splined as indicated at 88 (see FIG. 5) for detachable engagement in a coupling 90 mounted on and driven by a hydraulic motor 92 to which hydraulic fluid is furnished by flexible hoses 94. Hydraulic motor 92 is mounted slidably on a rod 94 disposed at one side of platform 18 and pivoted to the corresponding sidemost beam 34 of said platform on a horizontal axis transverse to said platform, as at 96 (see FIGS. 1 and 2). Thus spindle 78 has a substantially "floating" relationship with trough 16, and is free to move upwardly, forwardly, or rearwardly in the trough, as the bale forming thereabout increases in diameter, once its stub axles 80 and 82 are lifted free from notches 84 of posts 86. Platform 18 also includes a series of elongated leaf springs 98, spaced regularly across the width of said platform. Referring to FIG. 7, each of said springs is affixed at its lower end to one of beams 34 of the platform, beneath the level of floor 56, as at 100. Said spring extends upwardly through a hole formed therefor in floor 56, and when relaxed, curves upwardly and then forwardly (counterclockwise as viewed in FIG. 7) around spindle 78, when said spindle is supported by posts 86.

Spindle 78 also includes pairs of angle irons 102 (see FIGS. 5–7) extending longitudinally the full length thereof, at spaced angular intervals thereabout, each pair of angle irons including legs projecting outwardly from said spindle in parallel relation. A series of fingers 104 are mounted at intervals between each of said pairs of angle irons, each finger being pivoted at one end between said angle irons, as at 106, on an axis transverse to the spindle. Each finger pivots freely between an extended position generally radial to the spindle, and a retracted position lying entirely between its associated angle irons as indicated by arrows 108 in FIG. 5.

Mounted in the forward portion of main frame 2, just behind forward cross bar 8 thereof, is a hay pick-up device 110. Suitable pick-up devices for this purpose are already common and well known in the art, and the device is therefore not here detailed. For present purposes, suffice it to say that said pick-up device includes a housing 112 mounted in frame 2 by brackets 114, and a rake device 116 operable to pick up hay 118 deposited in windows on the ground by a mowing machine, and that is operable to discharge the hay through an opening 120 (see FIG. 4) in a rear wall of housing 112. The pick-up device may be powered by a hydraulic motor 122 to which hydraulic fluid is supplied by hoses 124, or by any other suitable means.

Hay discharged from opening 120 of the pick-up device housing is received on the upper surface of a conveyor C which extends generally forwardly and rearwardly and comprises an endless belt 126 trained about a pair of rollers 128 and 130 mounted respectively and rotatably at the forward and rearward ends of a conveyor frame 132 disposed between the belt reaches. The forward end of frame 132 is supported by a yoke 134 mounted for pivotal movement about a vertical axis by means of a pivot pin 136 engaged in a cross bar 138 extending transversely between and affixed to main frame rails 4. The forward end of the conveyor is positioned to receive thereon hay emerging from opening 120 of the pick-up device. The rearward end of the conveyor is supported by a yoke 140 which extends forwardly, and has affixed to the forward and thereof a rod 142 which extends forwardly and is pivoted to the top of pick-up housing 112 on a vertical axis, as at 144. Pivot 144 should be approximately coaxial with pivot pin 136. A twinbuckle 146 interposed in rod 142 permits vertical adjustment of the rearward end of the conveyor. The conveyor is powered by a hydraulic motor 148 mounted on conveyor frame 132 and to which hydraulic fluid is supplied by hoses 150, or by any other suitable means.

The support of conveyor C on vertical pivots 136 and 144 permits the rearward end of said conveyor, which is disposed above the portion of platform 18 projecting forwardly of the lower edge of wall 20, to be swung horizontally from side to side, as indicated by dotted line positions C' and C" in FIG. 3, whereby hay discharged by said conveyor to said platform may be distributed evenly and uniformly across the width of said platform. To perform this swinging of the conveyor, rod 142 is extended forwardly from pivot 144, and is connected at its forward end by a vertical pivot 152 to the free end of the piston rod 154 of a double-acting hydraulic cylinder 156, the opposite end of said cylinder being connected to pick-up housing 112 by a vertical pivot 158. Thus the delivery of fluid to alternately opposite ends of said cylinder, at the proper intervals, will cause conveyor C to oscillate regularly between positions C' and C". Fluid for said cylinder is supplied by hoses 160 to a control valve 162 mounted on housing 112, and by hoses 164 from said control valve to said cylinder. Said control valve is provided with an operating lever 166 operable selectively by movement thereof in relatively opposite directions to set said valve to deliver fluid under pressure to either end of the cylinder. Said lever is operated by a pair of relatively angled fingers 168 and 170 affixed to and movable with rod 142. Thus, as conveyor C approaches position C', finger 170 engages lever 166 to set valve 162 to cause cylinder 156 to reverse the motion of the conveyor to cause it to move toward position C", and when the conveyor reaches position C", finger 168 engages lever 166 to reverse the cylinder operation again, and so on.

The hydraulic pump or pumps, valves, and other controls for operating the various hydraulic motors and cylinders may be standard and are therefore not here shown. The pump or pumps could be mounted on frame 2 and driven either by gasoline engines also mounted on the frame, or driven mechanically by the power takeoff system of the tractor towing the machine. Also, the various pumps and cylinders could be powered by the hydraulic system of the tractor, if the tractor is equipped with a hydraulic power take-off system of sufficient capacity. Also, it may be desirable to drive certain elements of the machine, particularly conveyor chains 38, conveyor belt 126, and pick-up device 110, directly from the mechanical power-take-off of the tractor, rather than by hydraulic motors as shown. All of these alternatives are considered to be well within the purview of the invention.

In operation, the machine is towed forwardly by a tractor connected thereto by hitch 12, with pick-up device 110 operative, with conveyor C being oscillated between positions C' and C" by cylinder 156, with conveyor belt 126 being driven by motor 148 to move the upper reach thereof rearwardly, with platform 18 elevated to its raised position as shown in FIG. 1 by extension of rams 26, with conveyor chains 38 of said platform being driven by motor 50 so that their upper reaches move rearwardly, with axles 80 and 82 of spindle 78 resting in notches 84 of posts 86, and with said spindle being driven by motor 92 in a counter clockwise direction as viewed in FIGS. 1 and 7. Hay picked up by rake 116 of pick-up device 110 is then discharged from rear opening 120 of said device onto the conveyor C, by which it is transported rearwardly and dropped onto the top surface of the portion of platform 18 which extends forwardly from the lower edge of wall 20, said hay being distributed evenly across the width of the platform by virtue of the transverse oscillatory movement of the conveyor as previously described. The hay is then transported rearwardly on platform 18 through window 68, by conveyor chains 38 and the cleats 54 of said chains, and passes beneath spindle 78, the fingers 104 of which are extended by gravity as they traverse the lower portions of their orbits. Thus the hay catches on said fingers, and is thereby caused to start wrapping around said spindle to form a bale B. This starting action is improved also by springs 98, which elevate any hay not caught by spindle fingers 104, and hence tending to continue rearwardly on platform 18, upwardly away from the platform and forwardly over the spindle. The bale, once started in this manner, gradually increases in diameter as more and more hay is added to the surface thereof, and springs 98, which by their yieldability are always pressed against the bale rearwardly of its line of contact with the platform, function at all times to press the newly added hay into the hole to form at least an initial bond therebetween. The bale is of course cylindrical, and at this time is being rotated in a counter-clockwise direction, as viewed in FIG. 1, both by conveyor chains 38 and by spindle 78.

Almost immediately after the bale has been started, its increasing diameter causes it to lift spindle axles 80 and 82 out of notches 84 of posts 86, this floating motion of the spindle being permitted by the slidable mounting of hydraulic motor 92 on pivoted rod 94. After the bale is well started, the need for the power driving of spindle 78 no longer exists, since by that time the bale is of sufficient weight to be firmly engaged by cleats 54 of chains 38 so that rotation of the hole is continued by said chains only. Hence, at this time, coupling 90 of motor 92 may be disengaged from axle 82 of the spindle, the motor shut off and rod 94 pivoted out of the way. Alternatively, the hydraulic system of motor 92 could be a "demand" system whereby only a certain torque is maintained on spindle 78 even though it will turn at a progressively slower rate as the diameter of the bale increases, if the speed of chains 38 remains constant.

As the bale is being formed as described above, it is maintained in contact with platform 18 and wall 20 by gravity, having a strong rearward rubbing or wiping action against platform 18, and a downward rubbing or wiping action against face plate 66 of wall 20. A similar rubbing action is maintained against the vertical ends of the bale by side walls 60 and 76. This rubbing or wiping action, which increases in force and intensity as the bale increases to its full weight of many tons, assists not only in the firm compaction of the hay without necessity of a hay press per se, but also tends to "thatch" the bale surface by arranging the strands of hay in parallel circumferential relation and pressing them into the bale with great force. This "thatching" action greatly increases the resistance of the bale to penetration by rain or other moisture, and therefore greatly reduces spoilage if the bales are stored in the open.

When the bale has been built up to the desired diameter, the machine is stopped, the various hydraulic motors are shut off, motor 92 is disengaged from spindle axle 82 (if it has not already been disengaged) and spindle 78 is withdrawn from the bale toward the larger end thereof. This withdrawal is facilitated both by the tapered form of the spindle, and by the fact that spindle fingers 104 automatically collapse to positions between angle irons 102 as the withdrawal movement is commenced. Hydraulic rams 26 are then allowed to collapse by exhausting fluid therefrom, whereby platform 18 pivots downwardly on pivots 22 to a position in which the rearward edge thereof is disposed just above ground level, in which position it is supported by rollers 24. The bale then rolls rearwardly along the platform by gravity and is thereby deposited gently on the ground, or, if it does not roll of its own accord, it may be discharged by operating chains 38 in the same direction as before. The machine may also be used to pick up and transport bales previously deposited on the ground by lowering the platforms as just described, and moving the machine rearwardly to push the rearward edge of the platform under a bale resting on the ground, while at the same time operating chains 38 in a reverse direction, so that their upper reaches move forwardly. Motor 50 driving said chains is reversible for this purpose.

It will be noted that the bale produced has a hollow passage extending axially therethrough. This is an aid in curing of the hay, in that an air heater and blower may be connected to one end of the passage and the other end of the passage plugged, whereupon the heated air will enter the passage and filter outwardly through the body of the bale in all directions. If a number of the bales are laid in end to end relation, the axial passages of adjacent bales may be connected by tubular canvas "wind socks", and all of the bales cured by a single heater and blower.

While I have shown and described a specific embodiment of my invention, it will be readily apparent that many minor changes of structure and operation could be made without departing from the spirit of the invention.

What I claim as new and desire to protect by Letters Patent is:

1. A hay baling machine comprising:
   a. a wheeled frame adapted to be towed over the ground,
   b. an upwardly opening V-shaped trough carried by said frame and consisting of a pair of inclined wall members the planes of which intersect on a horizontal line defining the apex of said trough,
   c. hay pick-up and transporting means carried by said frame and operable as said frame is moved over the ground to pick up hay from the ground and to deposit said hay in said trough,
   d. a horizontal spindle disposed within said trough generally parallel to the apex thereof, said spindle being supported by said trough for free floating movement toward and from the apex thereof;
   e. means for rotatably driving said spindle whereby hay deposited in said trough is wrapped about said spindle to form a cylindrical bale supported by said wall members,
   f. conveyor means carried by one of said wall members for movement along the surface thereof in a direction normal to and away from the apex of the trough, said conveyor means being movable in the same direction as the most closely adjacent portion of said spindle, whereby to assist in the rotation of said bale, and
   g. means for driving said conveyor means.

2. A hay baling machine as recited in claim 1 wherein said spindle is longitudinally tapered and is detachable from said trough and its driving means, whereby to facilitate longitudinal withdrawal thereof from said bale.

3. A hay baling machine as recited in claim 1 with the addition of a series of fingers mounted in said spindle and normally projecting outwardly therefrom whereby to assist in the winding of hay thereon to form said bale.

4. A hay baling machine as recited in claim 3 wherein said spindle is longitudinally tapered, and wherein each of said fingers is pivoted in said spindle on an axis transverse to said spindle for movement from its normal projecting position to a retracted position in which it does not project outwardly from said spindle, whereby to facilitate longitudinal withdrawal of said spindle from said bale.

5. A hay baling machine as recited in claim 1 with the addition of support members carried by said trough and operable to support said spindle in closely spaced relation to the apex of said trough, said spindle being elevated out of engagement with said support members by said bale as the diameter of said bale is increased by the addition of a continuous supply of hay to said trough.

6. A hay baling machine as recited in claim 1 wherein said conveyor means comprises a series of endless conveyor chains distributed in spaced relation across the width of the associated wall member and trained around said wall member with their upper reaches resting on the upper surface of said wall member and extending at right angles to the apex of said trough.

7. A hay baling machine as recited in claim 6 with the addition of cleats secured at spaced intervals to each of said chains, and projecting outwardly therefrom.

8. A hay baling machine as recited in claim 1 with the addition of vertical side walls affixed to and rising from each side of each of said trough wall members.

9. A hay baling machine as recited in claim 1 wherein said wall member carrying said conveyor means projects beneath and beyond the lower edge of the other of said wall members, the lower edge of said other wall member terminating above the top surface of the wall member carrying said conveyor means whereby to form a window therebetween, and wherein said hay pick-up and transporting means is operable to deposit hay on the projecting portion of the wall member carrying said conveyor means.

10. A hay baling machine as recited in claim 1 wherein said transporting means comprises a conveyor operable to receive hay from said pick-up means and operable to deliver hay, at any given moment, to a portion of the width of said trough less than the full width thereof, said conveyor being movably mounted in said frame for movement of the discharge end thereof transversely of said trough, and with the addition of power means carried by said frame and operable to move the discharge end of said conveyor oscillatably across the full width of said trough.

11. A hay baling machine as recited in claim 1 wherein one of said trough wall members is pivoted at its lower edge to said frame on a horizontal transverse axis, and with the addition of operating means carried by said frame to move said pivoted wall member to a position in which it is inclined downwardly from the pivoted edge thereof and its opposite edge is disposed closely adjacent ground level, whereby to facilitate unloading of bales from said machine.

12. A hay baling machine as recited in claim 11, wherein the pivoted trough wall member is the wall member carrying said conveyor means, whereby said conveyor means further facilitates unloading of bales from said machine.

13. A hay baling machine as recited in claim 12 wherein said driving means for said conveyor means is reversible, whereby said conveyor means may be used to reload a previously unloaded bale onto said machine, for the purpose of transporting said bale.

\* \* \* \* \*